Feb. 25, 1941.    K. TANK    2,232,982
AUTOMATIC SERVO RUDDER TRIMMING DEVICE
Filed June 12, 1939    2 Sheets-Sheet 1

Inventor
Kurt Tank
Michaelis & Michaelis
Attys.

UNITED STATES PATENT OFFICE 2,232,982

AUTOMATIC SERVO RUDDER TRIMMING DEVICE

Kurt Tank, Bremen, Germany, assignor to Focke-Wulf Flugzeugbau G. m. b. H., Bremen-Flughafen, Germany, a company of Germany Application June 12, 1939, Serial No. 278,617
In Germany June 16, 1938

2 Claims. (Cl. 114—144)

My invention relates to an automatic servo rudder trimming device for use in aircraft.

It is an object of my invention to provide means whereby a servo rudder attached to a control surface is trimmed automatically relative to this surface when this latter is adjusted, whereby the forces counteracting such adjustment can be more readily overcome.

It is another object of my invention to utilize these counteracting forces for the trimming of the servo rudder and for adjusting in a suitable manner the angle of incidence between the servo rudder and the control surface with which it is associated.

Other objects will appear as the specification proceeds.

Known automatic trimming devices adapted to adjust a servo rudder in relation to the principal rudder or control surface are generally operated either mechanically or by means of hydraulic systems enabling great forces to be applied for shifting the servo rudder. They involve the drawback that the rods which partly project beyond the streamlined rudder surfaces generate eddies. They also are affected by low temperature, by thickening of the oil, and by leakage of the oil pipes.

It has also been proposed to deflect the servo rudder by an electromotor, which may be arranged on the rudder axis within the body of the main control of the servo rudder, this motor being controlled by remote control from the pilot's seat.

The trimming device according to the present invention belongs to the electric type, in which the servo rudder is adjusted automatically in dependency upon the position of the main control surface. The electromotor serving to effect the adjustment is influenced by the forces acting on the rods, cables or other members serving to control the main rudder. During the control the servo rudder is deflected relative to the main rudder by the electromotor in such manner that actuation of the control by the pilot is facilitated. The invention may be applied to any control surface or rudder combined with a servo rudder. As a rule such servo rudders are hinged at the trailing edge of the main rudder or control surface and therefore can be turned about an axis which coincides with or extends near the trailing edge. In any case the servo rudder is adjusted somewhat prior to the adjustment of the main rudder or control surface in a direction such that the further deflection of the main rudder or control surface is facilitated.

In the drawings affixed to this specification and forming part thereof several embodiments of my invention are illustrated diagrammatically by way of example.

In the drawings—

Figure 1:
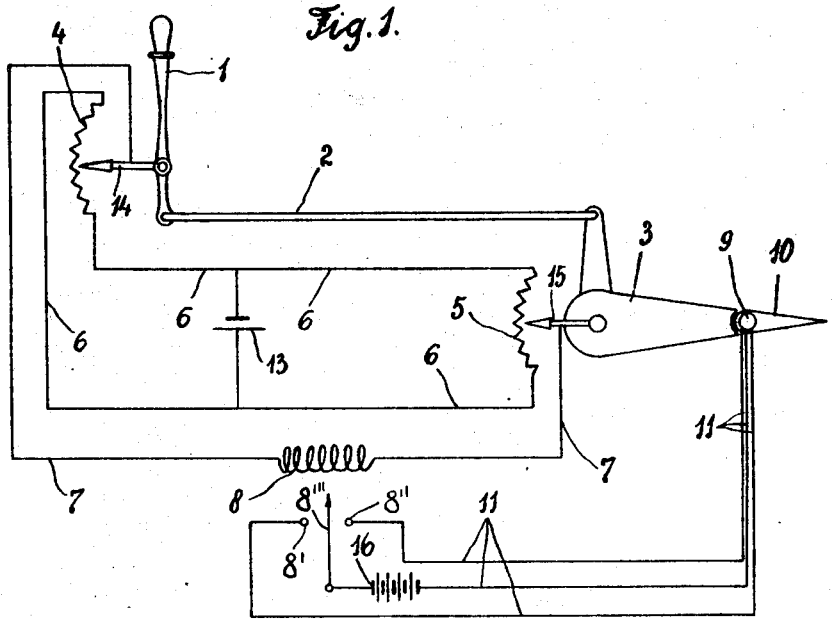
Figs. 1 and 2 are diagrammatic views of the system of connections characteristic of an embodiment of my invention in which the control includes at least one member, the deformations of which are utilized for regulating the electromotor serving to adjust the servo rudder.
Figure 2:
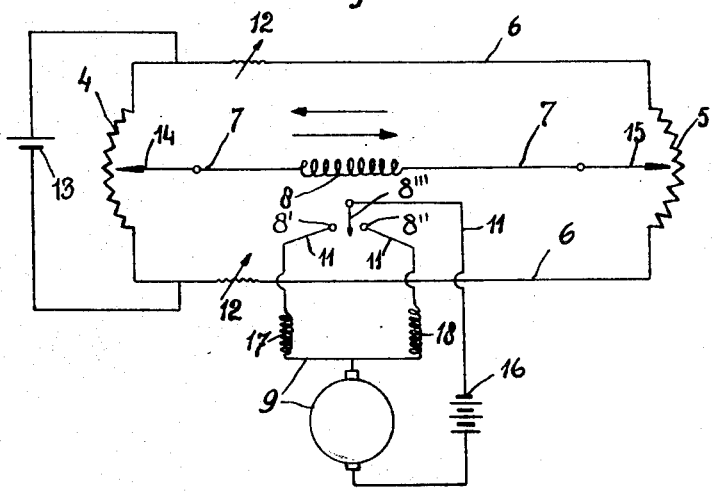

Referring to the drawings and first to Fig. 1, 1 is a control stick by means of which the main rudder or control surface 3 can be adjusted with the aid of a rod 2. Electric resistances 4 and 5 connected with the control stick 1 and the principal control surface 3 respectively, are inserted in an electric circuit which is connected with a source of current such as a battery 13. The electric circuit illustrated in Fig. 2 is in many respects similar to that shown in Fig. 1 except variable inductances 12, 12 are inserted therein. The keys 14 and 15 of the resistances 4 and 5 are connected through wire 7, with the winding of a change-over relay 8. The two contacts 8', 8" of this relay are connected, by a switch 8'" and wires 11, with a source of current such as the battery 16, and with the electromotor 9 which is arranged for shifting the servo rudder 10. The motor 9 has two windings 17, 18 which are connected with the contacts 8', 8" of relay 8 by means of wires 11 and on being excited, turn the rotor of the motor 9 clockwise as well as counterclockwise, whereby the rudder is adjusted correspondingly. In the circuit 6 are inserted two further adjustable resistances 12, 12' which by a variation of their resistance value bring about the trimming or presetting of the servo rudder.

This device operates in the following manner:

If the control stick 1 is actuated for a movement of the control surface 3 without substantial forces acting on the control surface and thereby on the control stick, the two keys 14 and 15 are shifted uniformly and synchronously. Accordingly no current will flow through the wires 6 and 7. The relay 8 is not actuated, so that the motor 9 remains at rest, and the servo rudder 10 remains in its position relative to the control surface 3.

If, however, the control stick is actuated while comparatively strong forces act on the control surface, the rod 2 is elastically deformed, so that the position of the control stick 1 does not any more accurately correspond to the position of the control surface 3. In consequence of this change of position of the control stick the key 14 of resistance 4 is shifted from the original position taken by the two keys 14 and 15. Even a small deviation from the original position of the two keys with relation to each other causes a current to flow in the circuit 6. Accordingly a current is caused to flow through the circuit 7, the keys 14 and 15, and the winding of the relay 8. One of the contacts 8', 8'' of this relay is thus closed by the key 8''' whereupon the electromotor 9 is connected with the battery 16 so as to deflect the servo rudder until the keys 14 and 15 have regained their original position. The direction in which the servo rudder is moved depends on the direction of the current in the circuit 7. The relay 8 is therefore connected with the wiring 11 in such manner that the servo rudder is moved so as to diminish the counterforces acting on the control during its actuation. To this end the motor 9 includes two windings 17 and 18, one causing the rotor to turn clockwise while the other causes the rotor to turn counter-clockwise.

In the circuit 6 which is fed with current from a source of current such as battery 13 two additional adjustable resistances 12, 12' are inserted which enable the servo rudder to be preset, thus permitting of regulating the starting angle of incidence between the servo rudder and the main control surface 3, i. e. the angle formed by these two rudders in the absence of substantial forces acting on the same.

Figure 3:
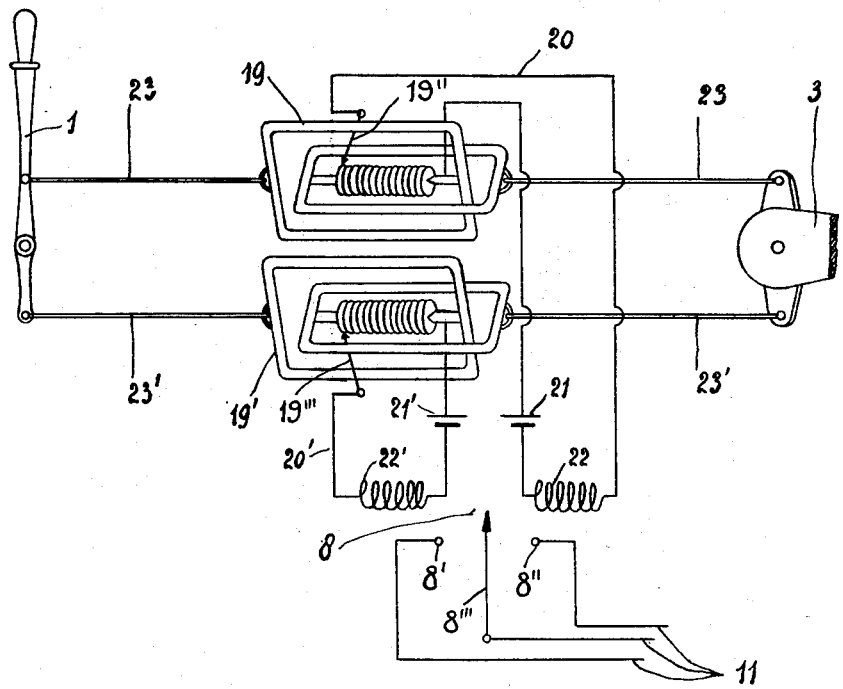
Fig. 3 is a similar view of part of a corresponding system of connections characteristic of a modification of my invention, in which the electromotor for shifting the servo rudder operates under the control of a variable electric resistance which on being actuated changes its value under the influence of forces occurring in the control of the main control surface.

In the modification illustrated in Fig. 3 I make use of a variable resistance 19 which comprises a column of carbon crystals superposed on each other. These individual crystals are held together by any means known to be suitable. The value of resistance of such a column depends on the pressure exerted at its two ends. Two such carbon crystal resistances 19 and 19' are employed in the modification of my invention shown in Fig. 3, each one being inserted in one of two control cables 23 and 23' which are drawn in opposite directions when the control stick 1 is actuated. The two resistances are arranged in such manner that the identical pressure is exerted on both resistances if during the actuation of the control stick no substantial forces act on the control surface 3, while different pressures are exerted on the two resistances, so as to impart the same with different values of resistance if substantial forces act on the control surfaces, thus counteracting the actuation of the control stick. Either resistance forms part of an electric circuit, 20 and 20', each of which contains a source of current such as the batteries 21 and 21'. These circuits are so arranged that a current of identical magnitude will pass through them when the two resistances 19 and 19' are exposed to the same pressures. If the pressure exerted for instance on the column of resistance 19, increases, the electrical resistance of this column of carbon crystals decreases so that a more powerful current flows through the circuit 20. The change-over relay 8, whose contacts 8', 8'' and switch 8''' are connected with wires 11 in which is inserted a source of current and which lead to the motor 9 serving to adjust the servo rudder 10 (Fig. 1), is equipped with two windings 22 and 22' which form part of the circuits 20 and 20', respectively, for a carbon crystal resistance can be used only in one direction, i. e can be influenced only by increased pressure so that two of such variable resistances must be arranged each in one of two opposed control cables. The windings 22 are excited as well and now the switch 8''' moves toward the contact 8'', so that the wiring 11 is closed when the magnitude of the current in circuit 20 exceeds that of the current prevailing in circuit 20'. The relay 8, the wiring 11 and the electromotor are so arranged that the servo rudder is again shifted so as to diminish the counterforces acting on the control.

The trimming or presetting of the servo rudder may be effected by means of keys 19'', 19''' adjustable from the pilot's seat whereupon the resistance value of the carbon-crystal resistances 19, 19' is changed correspondingly.

The carbon crystal resistances may be rendered adjustable so that the starting position of the servo rudder in relation to the main control surface to which it is attached can be trimmed also in this modification. The wiring of the circuits 20 and 20' may for this purpose be attached to the column of carbon crystals by means of slides, for instance the keys 19'' and 19'''.

In order to prevent the servo rudder from being shifted merely by brief shocks striking the main control surface, I adjust the sensitivity of the automatic trimming device or gear so that it is rendered effective only by a pressure acting on the control surface for a comparatively extended period of time. Members may therefore be provided capable of absorbing small and temporary variations in pressure such as are not supposed to cause a movement of the servo rudder. The control rods employed in the modification illustrated in Figs. 1 and 2 act as such members, since they are deformed only if the pressure exerted on the control exceeds a predetermined value which depends on the material and the construction of the controls. The yielding carbon crystal resistance referred to above is also capable of absorbing brief shocks acting on the control surfaces, since the resistance of the column of carbon crystals is varied only, by a pressure exerted on the column exceeding a minimum value.

Preferably the motor for shifting the servo rudder is closely associated with the servo rudder and e. g. is arranged within the body of this rudder, while the changeover relay and the source or sources of current are preferably placed in the pilot's cockpit.

The automatic control of the servo rudder according to the invention, superposed to the manual control of the main control surface, reduces the variations, particularly conspicuous with large aircraft, in power required for actuating the rudder to an extent such that the pilot must take care of shocks and the like in a predetermined, reliable measure. Simultaneously the wear on the control members for the rudder or control surfaces and on the structural parts of the entire craft is decidedly reduced.

I wish it to be understood that I do not desire to be limited to the exact details of construction shown and described, for obvious modifications will occur to a person skilled in the art.

I claim:

1. In a craft having a control surface including a servo rudder attached thereto; an automatic servo rudder trimming device comprising an electric motor adapted to be coupled to said servo rudder for shifting the servo rudder with respect to the control surface, a source of current and wiring forming a circuit for said electric motor, a control member including a yielding means adapted for connection with said control surface, and a regulator for varying the direction and strength of the current in said electric circuit connected with said control member and adapted for association with said control surface whereby variations in strain imposed on said means due to forces acting on said control surface will cause actuation of said electric motor to vary the adjustment of said servo rudder.

2. The system of claim 1, in which the regulator comprises a column of superposed carbon crystals.

KURT TANK.